United States Patent [19]

Weigand et al.

[11] Patent Number: 4,934,136
[45] Date of Patent: Jun. 19, 1990

[54] METHOD OF OPERATING AN EMERGENCY POWER UNIT

[75] Inventors: Francis K. Weigand, Torrance; Ronald J. Ness, Corona; Michael S. Koerner, Harbor City, all of Calif.

[73] Assignee: Allied-Signal Inc., Morris Township, Morris County, N.J.

[21] Appl. No.: 248,834

[22] Filed: Sep. 23, 1988

Related U.S. Application Data

[62] Division of Ser. No. 851,198, Apr. 14, 1986, Pat. No. 4,777,793.

[51] Int. Cl.⁵ .............................................. F02C 9/50
[52] U.S. Cl. .................................................... 60/39.03
[58] Field of Search ............... 60/39.02, 39.142, 39.15, 60/39.27, 39.461, 39.091, 727, 39.03

[56] References Cited

U.S. PATENT DOCUMENTS

| | | | |
|---|---|---|---|
| 2,611,239 | 9/1952 | Briggs | 60/39.141 |
| 2,643,511 | 6/1953 | Briggs | 60/39.27 |
| 2,872,782 | 2/1959 | Johnson et al. | 60/39.142 |
| 2,873,577 | 2/1959 | Kenney et al. | 60/39.142 |
| 3,004,387 | 10/1961 | Woodward | 60/39.27 |
| 3,965,673 | 6/1976 | Friedrich | 60/39.142 |

Primary Examiner—Louis J. Casaregola
Attorney, Agent, or Firm—David B. Abel; James W. McFarland; Robert A. Walsh

[57] ABSTRACT

An aircraft emergency power unit having a high pressure air storage tank, an aviation fuel storage tank, and a combustor which combusts pressurized air and aviation fuel in a stoichiometrically fuel rich ratio to produce a motive combustion gas.

10 Claims, 3 Drawing Sheets

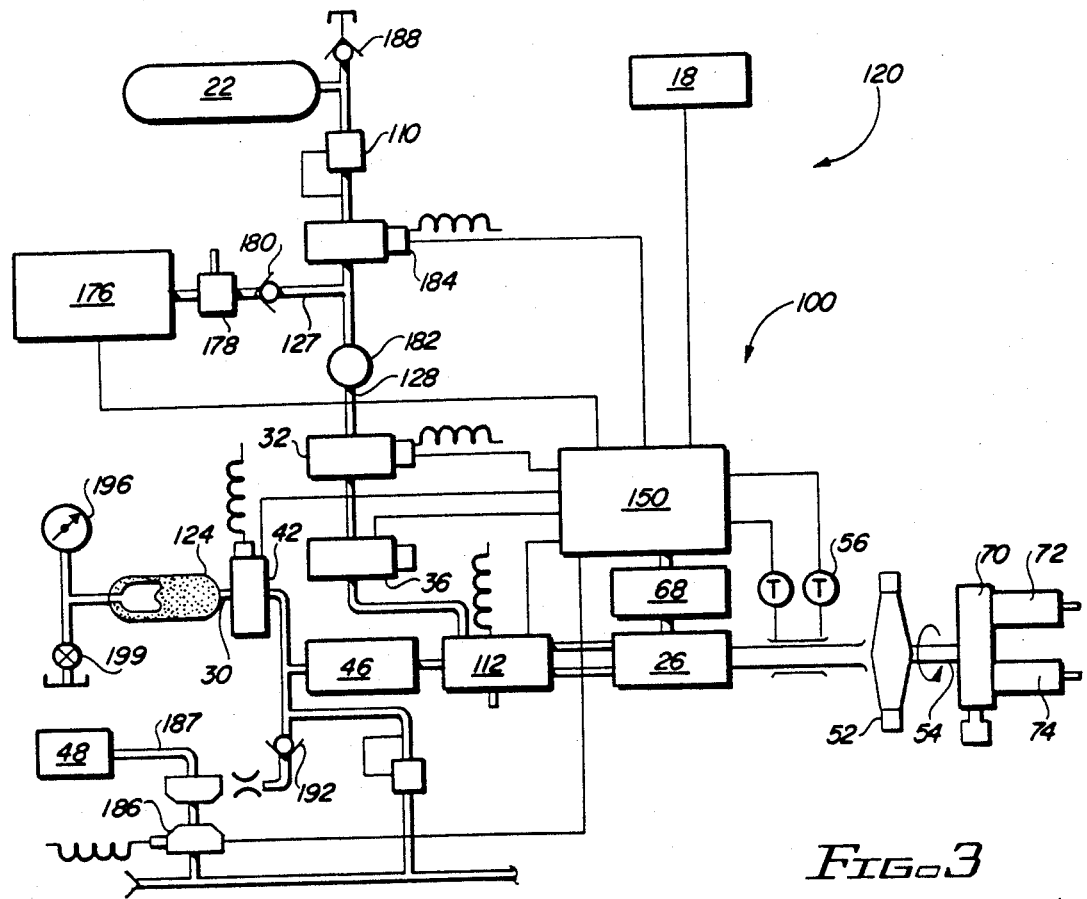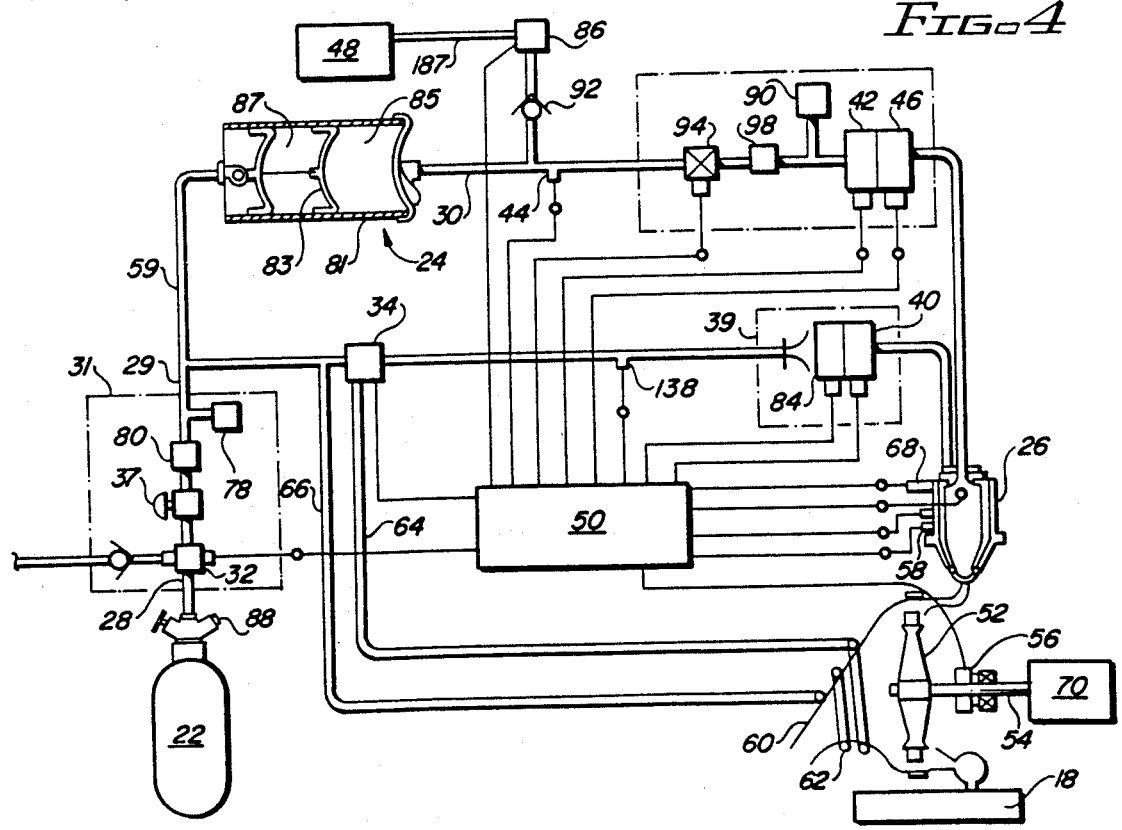
FIG-3
FIG-4

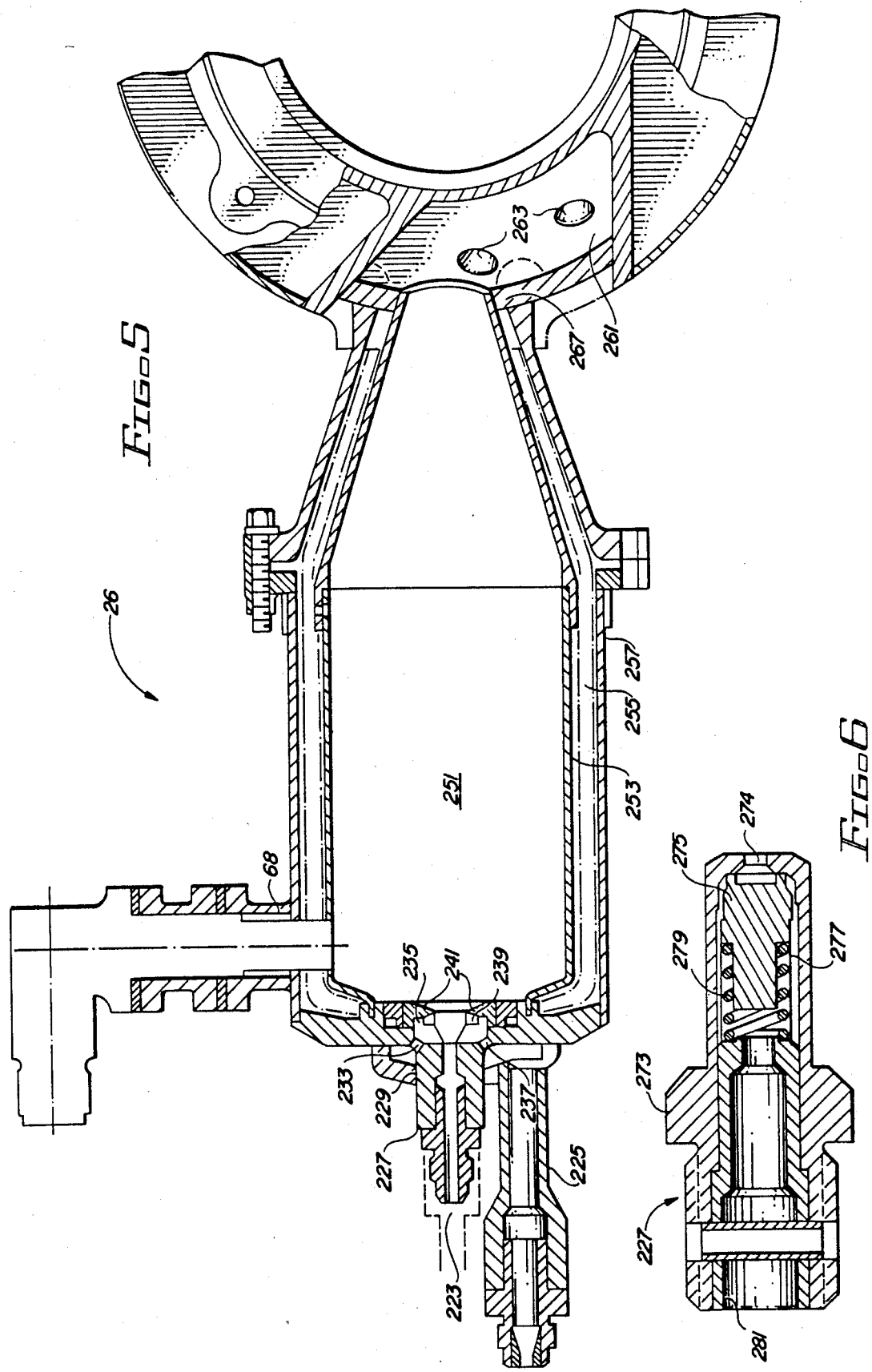

METHOD OF OPERATING AN EMERGENCY POWER UNIT

This is a division of application Ser. No. 851,198 filed Apr. 14, 1986 (U.S. Pat. No. 4,777,743).

BACKGROUND OF THE INVENTION

This invention relates to a system for providing emergency power on an aircraft. More specifically, this invention provides a stored energy subsystem using aviation fuel and compressed air which is burned in a fuel rich mixture to yield a controlled, high temperature, high pressure gas. The gas produced by the system may then be used to drive a turbine wheel, which may provide power to drive such devices as engine starters, electrical generators, and hydraulic pumps.

Generally, an aircraft has one or more primary engines which provide thrust for the aircraft, as well as pressurized bleed air for the environmental control systems. The primary engine also provides power to drive electric generators and hydraulic pumps, both of which are necessary for powering instruments and flight control systems. In addition, many aircraft also have an auxiliary power engine to provide electric and hydraulic power, as well as bleed air to the aircraft when the primary engines are not operating, for example when the aircraft is on the ground. The auxiliary power engine may also provide power to start the primary engines either on the ground or in flight. Both the primary engine and the auxiliary power engine operate on aviation fuel from the aircraft's main fuel tanks, mixed with air drawn from the atmosphere as the combustion components. For maximum fuel efficiency, these engines operate in a stoichiometrically air rich, fuel lean mode. In many instances, starting the auxiliary power engine requires an external power source such as a ground based start cart, a pressurized air tank, or an emergency power system. Since the auxiliary power engine is primarily designed to operate on the ground where the air is relatively dense, the auxiliary power engine may be incapable of operating at higher altitudes, for example above 55,000 feet. It is therefore evident that in many applications the auxiliary power engine would not be able to restart a failed primary engine above 55,000 feet, and in this event there would be no electrical or hydraulic power available. Also, since both the primary engine and the auxiliary power engine operate on fuel from the main fuel tanks, if this fuel supply is depleted there will be no source of power for the electrical and hydraulic power systems to allow the pilot to control and land the aircraft.

It is therefore desirable to have on an aircraft an emergency power system capable of operating independent of external conditions which can provide emergency electrical and hydraulic power to the flight control systems and may be used to restart the auxiliary or primary engines. These are the minimum requirements of the emergency power system. Since they are only operated in the event of an emergency, these systems remain stored and inactive for long periods of time, but are required to start instantly and provide continuous power output for a prespecified duty cycle. Ideally, such an emergency power system would be compact, lightweight, highly reliable, easily maintained, require no special handling of materials or fuels, while providing a combustion process which is controllable and which produces a clean, non-toxic combustion gas.

Presently, emergency power units primarily rely on liquid hydrazine based fuels sprayed into a catalyst bed to generate a pressurized gas. These units are in use on several aircraft and combine high performance with low weight. However, liquid hydrazine is highly corrosive and toxic, thereby requiring special handling procedures and design considerations. The catalyst material is expensive, and when the catalyst is depleted it must be replaced. Further, the combustion gas which is produced is toxic and therefore limits ground testing of the emergency power unit.

SUMMARY OF THE INVENTION

This invention contemplates an emergency power system operating on a fuel rich mixture of aviation fuel and air and optimizes the advantages of such a system to yield an emergency power system with the improved characteristics of relying on an energy source which is readily available, non-toxic, and clean burning, packaged in a compact, lightweight, highly reliable, and easily maintained emergency power unit.

Accordingly, it is an object of the invention to provide an emergency power unit, gas generator apparatus and method which stores compressed air and aviation fuel, and delivers a specific ratio of each fluid to a combustor which ignites and burns the two fluids in a fuel rich mixture producing a combustion gas which may be used to drive a turbine.

Another object is to provide such a method and apparatus including a control system to initiate, maintain and shut off the delivery of the working fluids to the combustor.

Another object is to provide such a method and apparatus including a control system which further monitors various output parameters to maximize the efficiency of the system.

Another object is to provide such a method and apparatus including a combustor which can maintain the combustion of the working fluids in the prescribed fuel rich ratio for extended periods of time without being damaged or being rendered inoperative due to heat or carbon deposit buildup.

Another object is to provide such a method and apparatus including a combustor having a nozzle which mixes the aviation fuel and air in the prescribed fuel rich ratio such that the fuel is essentially completely atomized and the center of the resulting flame of combustion is maintained along the central axis in the center of the combustion chamber.

Another object is to provide such a method and apparatus which includes a method and apparatus to resupply the aviation fuel and compressed air tanks subsequent to use.

Another object is to provide such a method and apparatus which can be retrofitted into aircraft which may or may not already have an emergency power unit.

Another object is to provide such a method and apparatus which can be attached to an auxiliary power unit.

Another object is to provide such a method and apparatus which can restart the aircraft's main engines.

Briefly, the invention contemplates the use of aviation fuel and compressed air as the stored energy source for an aircraft emergency power unit. When emergency power is required, the two fluids are allowed to flow through conduits which may include shutoff valves, temperature sensors, and flow control valves, to a specialized nozzle which ejects the two fluids into a combustor. The oxidizer (air) to fuel (aviation fuel) ratio is in a stoichiometrically fuel rich range of approximately 1.5 to 1, up to approximately 7 to 1, and thereby, upon combustion within the combustion chamber, produce a motive combustion gas having a temperature above 1400° F. The motive combustion gas is preferably directed into a turbine to provide output shaft power.

These and other advantages of the present invention are specifically set forth in, or will become apparent from the following detailed description of a preferred embodiment of the invention when read in conjunction with the accompanying drawings.

BRIEF DESCRIPTION OF THE DRAWINGS

In the Drawings:

FIG. 3 is a schematic diagram of an alternative emergency power unit embodying the principles of the present invention;

FIG. 4 is a schematic diagram of a second alternative emergency power unit embodying the principles of the present invention;

FIG. 5 is a partially schematic partially crosssectional view of the emergency power unit combustor;

FIG. 6 is a partially cross-sectional view of the nozzle of the combustor of the emergency power unit.

DETAILED DESCRIPTION OF THE PREFERRED EMBODIMENT

Figure 1:
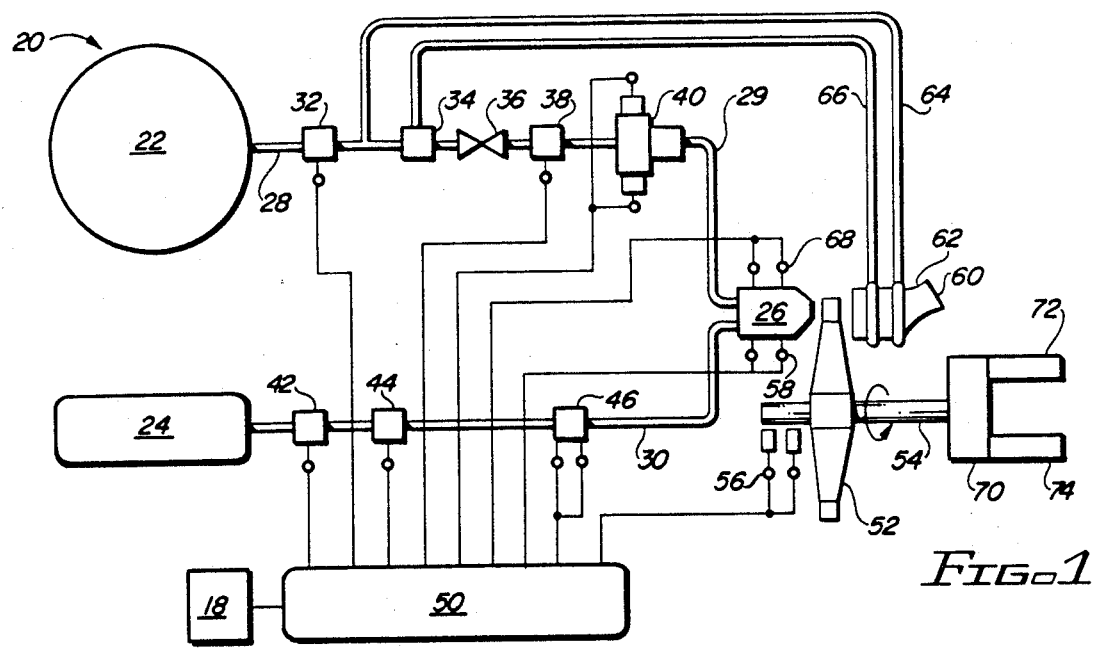
FIG. 1 is a schematic diagram of the emergency power unit embodying the principles of the present invention.

Referring now to the drawings, FIG. 1 shows an emergency power unit 20 having a high pressure air tank 22 and an aviation fuel tank 24 as stored energy means. The air tank 22 is connected via a high pressure air line 28, an air pressure regulator 36, and a regulated pressure line 29 to a combustor 26. Air line 28 also includes an air shutoff valve 32 and an air temperature control valve 34, while the regulated pressure air line 29 includes an air temperature sensor 38 and an air flow control valve 40. Similarly, the fuel line 30 between the fuel tank 24 and the combustor 26 includes a fuel shutoff valve 42, a fuel temperature sensor 44 and a fuel control valve 46. An electrical controller 50 for the emergency power unit 20 is electrically connected to the air shutoff valve 32, the air temperature sensor 38, the airflow control valve 40, the fuel shutoff valve 42, the fuel temperature sensor 44, the fuel control valve 46, as well as being electrically connected to an igniter 68, a pair of combustor temperature sensors 58, and a turbine speed sensor 56. The turbine speed sensor 56 is in relative proximity to, and senses the speed of an output shaft 54 which is attached to a turbine 52 which is driven by the combustion gases produced within the combustor 26. The output shaft 54 from the turbine 52 is connected to a gearbox 70 to drive a generator 72 and an hydraulic pump 74. Downstream of turbine 52, the combustion gases are directed through an exhaust duct 60 which may have an exhaust-to-air heat exchanger 62 mounted in heat exchange relationship thereto. The heat exchanger 62 is connected to a cool air conduit 64 which is connected at its opposite end to the high pressure air line 28 at a point between the air shutoff valve 32 and the air temperature control valve 34. The hot side of heat exchanger 62 is connected by a conduit 66 to the air temperature control valve 34.

Prior to operation, the high pressure air tank 22 is filled to several thousand p.s.i. with compressed air and the fuel tank 24 is filled with aviation fuel. The fuel tank 24 may be a positive displacement pressurized piston or bladder type of fuel tank. When emergency power is required, the controller 50 opens air shutoff valve 32 and fuel shutoff valve 42 to start the flow of air and fuel through the respective air line 28 and fuel line 30. Subsequently, the temperature control valve 34 mixes air coming directly from the high pressure air tank 22 with air which has been circulated through the heat exchanger 62, delivering this controlled temperature high pressure air to the pressure regulator 36 which reduces the air pressure to an appropriate regulated pressure level. Controller 50 also uses the air temperature signal from the air temperature sensor 38 and a fuel temperature signal from the fuel temperature sensor 44 to direct the air flow control valve 40 and the fuel control valve 46 to deliver a precise fuel to air ratio to the combustor 26. The fuel and air mix within the combustor 26 and the igniter 68 commences the combustion process. Once initiated, combustion is self-sustaining as long as fuel and air are delivered to the combustor. The controller 50 powers and controls the igniters 68, and receives input back from the combustor temperature sensors 58, and the turbine speed sensors 56 to combine with the air and fuel temperature measurements in order to optimize the performance and efficiency of the emergency power system, while regulating the turbine speed to a nominal, normally very high speed by adjusting fuel and air flow rates to the combustor 26.

It may be appreciated that as the compressed air supply within the high pressure air tank 22 is depleted, the temperature of the remaining air drops rapidly. Thus, the controller 50 must continuously monitor the regulated air temperature and the fuel temperature, which is also subject to variation, in order to properly modulate the fuel to air ratio delivered to the combustor 26.

The desired air to fuel ratio is in the fuel rich range of between 15:1 and 7:1 by weight to produce a combustion gas having a temperature above 1400° F. The optimum air to fuel ratio for the present system is approximately 15:1, producing a combustion gas having a temperature of 1850° F. Operating the emergency power unit 20 in a fuel rich mode minimizes the amount of compressed air required and thus minimizes the size of the high pressure air tank 22, and additionally maximizes the amount of energy which is available to provide useful power due to the high temperatures of the combustion gas produced.

Figure 2:
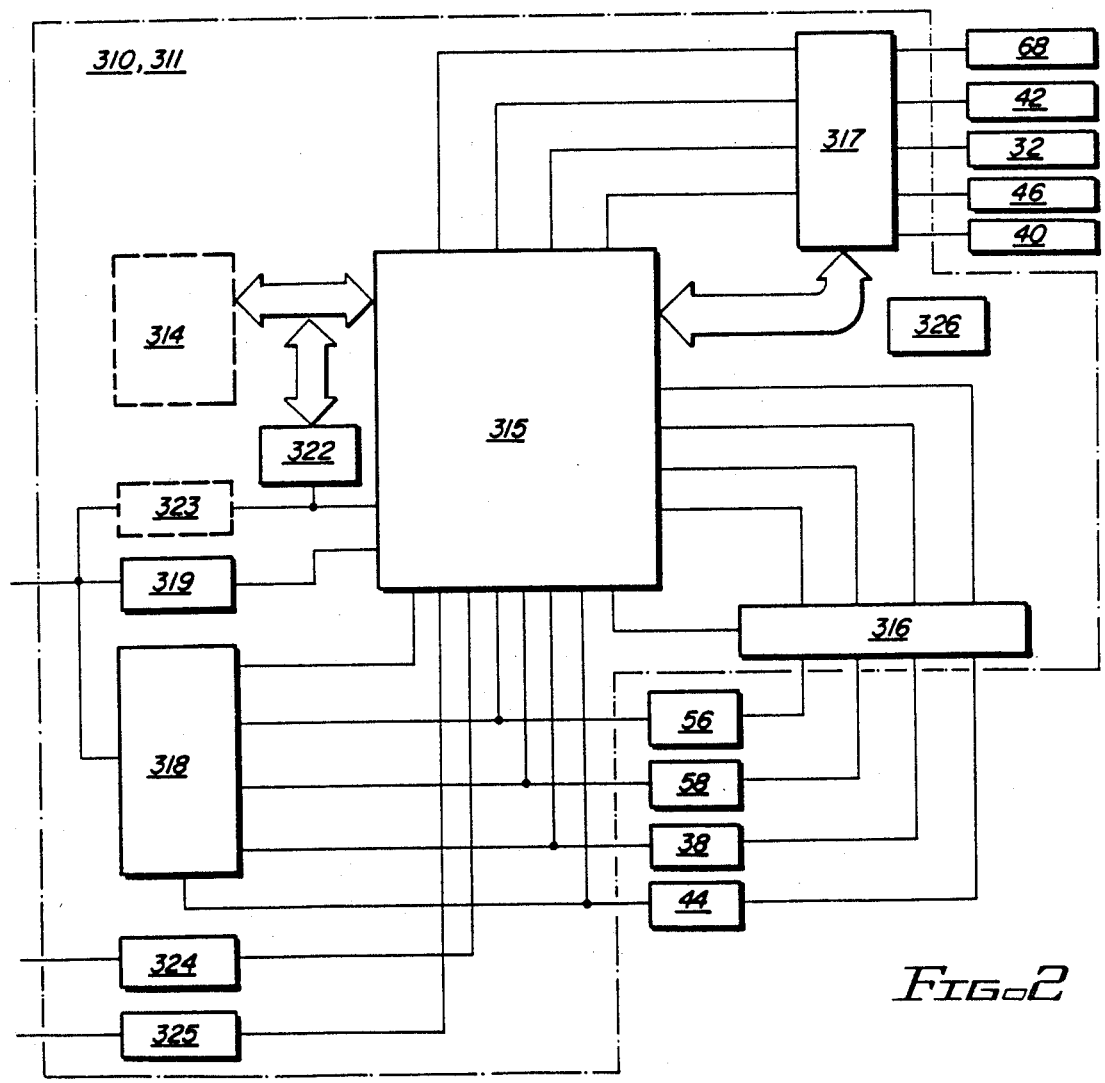
FIG. 2 is a block diagram of the electronic control unit hardware.

Since the emergency power unit 20 must remain dormant for extended periods of time between operations, the reliability of the controller 50 is critical. Thus, the controller 50 has two independent digital Electronic Control Units (ECU) arranged in a master ECU 310 and a slave ECU 311 configuration, shown in FIG. 2 is master ECU 310, slave ECU 311 having a substantially identical configuration and function, the ECU's 310 and 311 monitor the start/stop commands and the turbine operation. The controller 50 is provided with a Built In Test (BIT) to continually monitor the integrity of all of the electronic components. If the master ECU 310 fails to operate properly, or if major failure occurs to any of the electrical components of the system including the fuel shutoff valve 42, air shutoff valve 32, airflow control valve 40, fuel flow regulator 46, fuel temperature sensor 44, air temperature sensor 38, combustor temperature sensor 58 or the turbine speed sensor 56, the slave ECU 311 will activate, taking over control of the emergency power unit 20.

The master ECU 310 remains active as long as power is applied to the unit via the aircraft battery system (not shown) or a backup power pack. In the active state, it will perform various health checks of itself, the sensors and the control system components while waiting for a start command. At frequent intervals, the master ECU 310 will activate the slave ECU 311 via the test enable signal in order to determine the health of the standby control system. Should the master ECU 310 locate any failures in either of the master or slave ECU's, it will raise an alarm signal, either via a discrete output that can be relayed to the cockpit, or via an optional data bus 314. The slave ECU 311 is normally in a dormant, unpowered standby state, waiting either for a start command or for a test enable signal from the master ECU 310. After activation, the slave ECU 311 executes a self-test routine and reads the test enable and start/stop commands to determine the proper course of action.

A block diagram of the master ECU 310 hardware is shown in FIG. 2. The heart of the master ECU 310 is a single chip microcontroller 315. This microcontroller 315 encompasses nearly all of the circuitry needed for a digital controller, including bit analog to digital converter, channel multiplexers, timers, high-speed pulse inputs, high-speed pulse outputs, pulse-width-modulated outputs, Random Access Memory (RAM), Read Only Memory (ROM), watchdog timer, hardware multiply/divide, serial input/output port, external memory interface, and discrete inputs/outputs. Using these microprocessor functions, only an input buffer 316, an output buffer 317, a sensor exitation circuit 318, and a switching power supply 319, are required to complete the ECU functions. An external memory 322 may also be required to supplement the memory of the microcontroller 315. The external memory 322 also provides an interface with the optional data bus controller 314. An optional battery 323, makes the low-power RAM of the microcontroller 315 nonvolatile, preserving test information for off-line servicing. An EPU start/stop buffer 324, and an altitude buffer 325 provide inputs to the microprocessor.

To operate the master ECU 310, an external source of electrical power (not shown) provides +28 volts to the switching power supply 319 and the sensor exitation circuit 318. The switching power supply 319 uses a high frequency, pulse-width-modulation technique to provide isolated power for the gate drive circuits of the power switches within the microcontroller 315. The sensor exitation circuit 318 provides a reference voltage to the microcontroller 315, as well as power to activate the fuel temperature sensor 44, the air temperature sensor 38, and the combustor temperature sensor 58. Excitation power supplies are monitored by a self-test function of the micro-controller 315 to verify continuity of the sensor circuits. This test includes the turbine speed sensor 56, which is passive and thus does not normally require power. However, the sensor excitation circuit 318 may provide a voltage pulse to the turbine speed sensor 56 to verify circuit continuity. The output signals from the sensors: 38, 44, 56, and 58 go through the input buffers 316 then to the microcontroller 315. The microcontroller 315 analyzes these input signals and sends control signals via the output buffer 317 to the igniter 68, fuel shutoff valve 42, air shutoff valve 32, fuel flow regulator 46, and airflow control valve 40. The output buffer 317 also has a wraparound feedback loop to the microcontroller 315, and an external watchdog lockout 326.

The combustor 26 of FIG. 1, 3, and 4, is shown in a more detailed cross-sectional view in FIG. 5. A combustion chamber 251 is enclosed by a generally cylindrically shaped thermal liner 253 which tapers at one end thereof to an attachment 257 of a nozzle box 261. The thermal liner 253 is wrapped in ceramic insulation 255 and enclosed by a pressure shell 257. The oPposite end of the combustion chamber 251 is enclosed by an injector head 231 which has attached thereto a plenum cover 229 and an injector assembly 227. Attached to the plenum cover 229 is an air inlet assembly 225 which delivers air to an outer air plenum 233 enclosed by the plenum cover 229. A plurality of air passages 237 in the injector head 231 deliver air from the outer air plenum 233 to an inner air plenum 235. An air swirler 239 mounted to the injector head 231 includes a plurality of vanes 241 causing the air to swirl as it passes from the inner air plenum 235 into the combustion chamber 251. The injector assembly 227 of FIG. 5 as shown in FIG. 6 includes a nozzle body 273, a tangential poppet 275, a filter screen 277, a compression spring 279 and a cylindrical insert 281.

Combustor 26 is specifically designed to maximize the mixing of fuel and air as it enters the combustion chamber 251, ignite the mixture, and maintain the combustion process for extended periods of time without excessive carbon deposit buildup or melting of the combustor body. Aviation fuel flows to the injector assembly 227 through the center of the insert 281 within the nozzle body 273 and is strained by the filter screen 277 before flowing around a tangential poppet 275 held in place by the wire compression spring 279. The aviation fuel flows out through an opening 274 at the end of the nozzle body 273. Simultaneously, air flows through the air inlet 225 into the outer air plenum 233 where it is distributed circumferentially about the injector assembly 227 before flowing through the air passages 237 into the inner air plenum 235 whereupon the vanes 241 of the air swirler 239 impart a rotational motion to the air flow as it enters the combustion chamber 251. It is at this point where the air flow and the fuel flow mix and the fuel is atomized as the mixture enters the combustion chamber 251. A spark from the igniter 68 commences the combustion process. Due to the uniform mixing of the air and fuel resulting from the dual plenum design, the combustion flame is maintained in the center of the combustion chamber 251. However, the thermal liner 253 rapidly heats up to approximately the combustion temperature. The ceramic insulation 255 prevents the conduction of heat to the pressure shell 257 such that during normal operation the temperature of the pressure shell 257 does not exceed 500° F. while the thermal liner 253 may obtain temperatures up to 1800° F. The combustion gases then flow out of the combustor 26 into the nozzle box 261. The nozzle box 261 distributes the combustion gases through one or more nozzles 263 to impinge upon the turbine 52, and provide a motive farce to the turbine 52 causing the turbine 52 to rotate about the output shaft 54 and thus drive the generator 72 and/or the hydraulic pump 74.

The unique design of the walls of the combustor 26 promotes and stabilizes the combustion flame while minimizing the weight of the combustor system. The thermal liner 253 which is made of Inconel steel and has a very thin cross-section, rapidly heats up to the temperature of the combustor flame. Once the thermal liner 253 has heated sufficiently the hot thermal liner 253 tends to stabilize combustion process which is self-sustaining. The ceramic insulation 255, which is made of a woven ceramic cloth, prevents the conduction of heat to the pressure shell 257, which is also made of Inconel steel, and thereby minimizes the thickness of the cross-section of the pressure shell 257 which is required to contain the combustion pressures. A further benefit of operating the thermal liner 253 at combustion temperatures is that it effectively prevents the buidup of carbon deposits on the walls of the combustion chamber 251.

An alternate embodiment of the invention is shown in FIG. 3. This system is basically similar to the system of FIG. 1, however the system of FIG. 3 additionally includes apparatus for compressing air to replenish the high pressure air tank 22 or for supplying compressed air to the combustor 26, as well as apparatus for either refilling a pressurized bladder fuel tank 124 or delivering fuel to the combustor 26 directly from a primary fuel tank 48. This apparatus includes a positive displacement air pump 176, an air resupply line 127 including pressure relief valve 178, and an air check valve 180 in parallel with the high pressure air tank 22, having an air service valve 188, a second pressure regulator valve 110, and a secondary air shutoff valve 184. These two sources of pressurized air are attached to an accumulator 182 which is then connected via a high pressure air line 128 to air shutoff valve 32, air pressure regulator valve 36, and an air and fuel master shutoff valve 112, to the combustor 26.

The fuel supply side of emergency power unit 120 includes the pressurized bladder type of fuel tank 124 having a nitrogen service valve 199 and pressure gauge 196, and fuel valve 42 in parallel with a fuel pump 186 which can pump fuel directly from the aircrafts primary fuel tank 48 through a fuel resupply line 187 and a fuel check valve 192. The two sources of fuel are then merged upstream of fuel flow regulator valve 46 which regulates fuel to the master shutoff valve 112, immediately prior to the combustor 26. This system also includes an electrical controller 150 which is electrically connected to the secondary shutoff valve 184, air pump 176, air shutoff valve 32, air pressure regulator valve 36, fuel shutoff valve 42, fuel pump 186, master shutoff valve 112, as well as to the igniters 68, turbine speed sensors 56 and an aircraft cockpit console 18.

The remainder of the system of FIG. 3 is essentially the same as in FIG. 1. The electrical controller 150 performs all of the same functions, and additionally turns on the air pump 176 and fuel pump 186 when the high pressure air tank 22 and the pressurized bladder fuel tank 124 are nearly empty in order to provide a continuous source of emergency power after the stored fuel and compressed air has been combusted. With this system, the air pump 176 and fuel pump 186 may also be used to refill the high pressure air tank 22 and the fuel tank 124 when the emergency power unit 120 has been used and then shutoff while still in flight or on the ground.

Another embodiment of the invention is shown in FIG. 4. This system includes the high pressure air tank 22, a pressurized piston fuel tank 224, the combustor 26, and the turbine 52 similar to the systems of FIG. 1 and 3. The high pressure air line 28 leads from the air tank 22 to an air regulator valve 31. The air regulator valve 31 includes the air shutoff valve 32, pressure regulating valve 37, check valve 80 and relief valve 78 components. Regulated air pressure line 29 from the air regulator valve 31 is connected to a fuel tank air line 59 leading to the pressurized piston fuel tank 224, cool air conduit 66 leading to the heat exchanger 62, and air temperature control valve 34. The air temperature control valve 34 also has a connection to the hot air conduit 64 returning air from the heat exchanger 62. The regulated air line 29 coming from the air temperature valve 34 goes through an air control valve 39 before terminating at the combustor 26. The air control valve 39 includes a secondary air shutoff valve 84 and an airflow control valve 40. Fuel line 30 from the fuel tank 24 to the combustor 26 has a fuel trim valve 94, a filter 98, a pressure relief valve 90, the fuel shutoff valve 42 and the fuel control valve 46 placed therealong.

The pressurized piston fuel tank 224 of this embodiment is a positive displacement piston type of tank having an enclosed cylinder 81, with one end having a connection to the fuel line 30 and the other end having a connection to the fuel tank air line 59. Within the cylinder 81, a free floating piston 83 separates the tank into a fuel chamber 85 and an air chamber 87. When the air shutoff valve 32 is opened the air chamber 87 is pressurized to the regulated air pressure within air lines 29 and 59. Pressurizing the air chamber 87 forces the piston 83 to pressurize the fuel within the fuel chamber 85 to the same pressure as the regulated air pressure. Since piston 83 is free to move within the cylinder 81, the pressure on the fuel is maintained as the fuel is depleted.

This system may also include fuel pump 86 for supplying fuel from the primary fuel tank 48 to the pressurized piston fuel tank 224 via fuel resupply line 187, to resupply the depleted pressurized piston fuel tank 224 after use of the emergency power unit 20. A check valve 92 prevents the flow of fuel from pressurized piston fuel tank 224 through fuel resupply line 187 to the primary fuel tank 48.

The system of FIG. 4 is similar in operation to the systems of FIGS. 1 and 3 with the electrical controller 50 initiating the flow of aviation fuel and compressed air to the combustor 26, regulating the ratio of air to fuel delivered, and using sensor input to optimize the efficiency of the system.

As in the other systems of FIG. 1 and FIG. 3, the motive combustion gases produced in the combustor 26 are delivered to the turbine 52. In addition, a bleed air system 16 from the aircrafts main engines also provides a source of pressurized air which may be used to drive the turbine 52. Within this system, the emergency power unit 20 must be capable of supplementing the bleed air system 16 in driving the turbine 52, as well as provide the total power required by the turbine 52 in the event of main engine failure. Thus, the controller 50 may have to pulse the combustor 26 by supplying discrete amounts of air and fuel, and selectively powering the igniter 68. The controller 50 relies on feedback from the turbine speed sensors 56 to determine the emergency power load requirements, and then sets the duration, interval, and magnitude of each combustion pulse, thereby providing an averaged power output to the turbine.

While a number of specific embodiments of this invention have been illustrated and described, it is to be understood that these are provided by way of example only and that the invention is not to be construed as being limited thereto.

We claim:

1. A method for generating a controlled flow of motive gas to develop controlled, limited power for driving aircraft electrical and hydraulic accessory loads in the event of an aircraft emergency, comprising the steps of:
   delivering a flow of high pressure air from a high pressure storage tank on the aircraft to a combustor;
   delivering a flow of aviation fuel from a dedicated aviation fuel storage tank on the aircraft to said combustor;
   adjusting the rate of flow of both the pressurized air and the aviation fuel to maintain the ratio of air to aviation fuel delivered to said combustor in a fuel rich ratio in the range of between about 1.5:1 to 7:1 by said weight;
   combusting the air and aviation fuel while in said fuel rich ratio to generate therefrom said flow of motive gas at a temperature of at least about 1400° F.,
   directing said flow of motive gas upon a turbine mechanically connected to said electrical and hydraulic accessory loads;
   monitoring the power requirements of said aircraft electrical and hydraulic accessory loads; and
   variably controlling said flow of motive gas in response to the variable power requirements of said accessory loads.

2. The method according to claim 1 further comprising:
   maintaining the ratio of air to aviation fuel delivered to said combustor at approximately 3.5:1.

3. The method of claim 1 further comprising regulating the pressure of said high pressure air within said high pressure storage tank to a lower, regulated constant air pressure delivered to said combustor.

4. The method according to claim 1 further comprising:
   pressurizing said aviation fuel for delivery to said combustor.

5. The method according to claim 1 further comprising:
   pressurizing said aviation fuel within said aviation fuel storage tank; and
   regulating the flow of pressurized aviation fuel delivered from said aviation fuel storage tank to said combustor.

6. A method for generating a controlled flow of motive gas to develop controlled, limited power for driving aircraft accessory loads in the event of an aircraft emergency, comprising the steps of:
   delivering a flow of high pressure air from a high pressure storage tank on the aircraft to a combustor;
   measuring the temperature of said high pressure air from said high pressure storage tank;
   delivering a portion of said high pressure air from said high pressure storage tank through a heat exchanger to increase the temperature of said diverted portion of air;
   mixing said diverted portion of air into the high pressure air flow between said storage tank and said combustor;
   delivering a flow of aviation fuel from a dedicated aviation fuel storage tank on the aircraft to said combustor;
   adjusting the rate of flow of both the pressurized air and the aviation fuel to maintain the ratio of air to aviation fuel delivered to said combustor in a fuel rich ratio in the range of between about 1.5:1 to 7:1 by weight;
   combusting the air and aviation fuel while in said fuel rich ratio to generate therefrom said flow of motive gas at a temperature of at least about 1400° F.; and
   directing said flow of motive gas upon a turbine mechanically connected to said accessory loads.

7. A method for providing emergency accessory power to an aircraft, comprising the steps of:
   monitoring the accessory power requirements of said aircraft;
   storing compressed air within a high pressure air storage tank on said aircraft;
   delivering a flow of said compressed air from said air storage tank to a combustor;
   delivering a flow of aviation fuel of the type used to operate aid aircraft's main engines to said combustor;
   regulating the amount of aviation fuel and air delivered to said combustor in response to the power requirements of said aircraft;
   combusting said compressed air and aviation fuel within said combustor to produce a flow of motive gas;
   adjusting the relative rates of flow of said compressed air to said aviation fuel being delivered to said combustor such that the resulting flow of motive gas is maintained at a temperature of at least about 1400° F.; and
   directing said flow of motive gas upon a turbine to induce rotational motion of said turbine, said turbine being mechanically connected in driving relationship to accessory power devices of said aircraft.

8. The method of claim 6 further comprising:
   providing an amount of aviation fuel to said combustor in excess of the stoichiometric burning ratio of air and aviation fuel.

9. The method of claim 8 wherein the excess fuel is vaporized within said combustor.

10. The method of claim 8 wherein the ratio of air to aviation fuel is in the range of between 1.5:1 to 7:1 by weight.

* * * * *